UNITED STATES PATENT OFFICE.

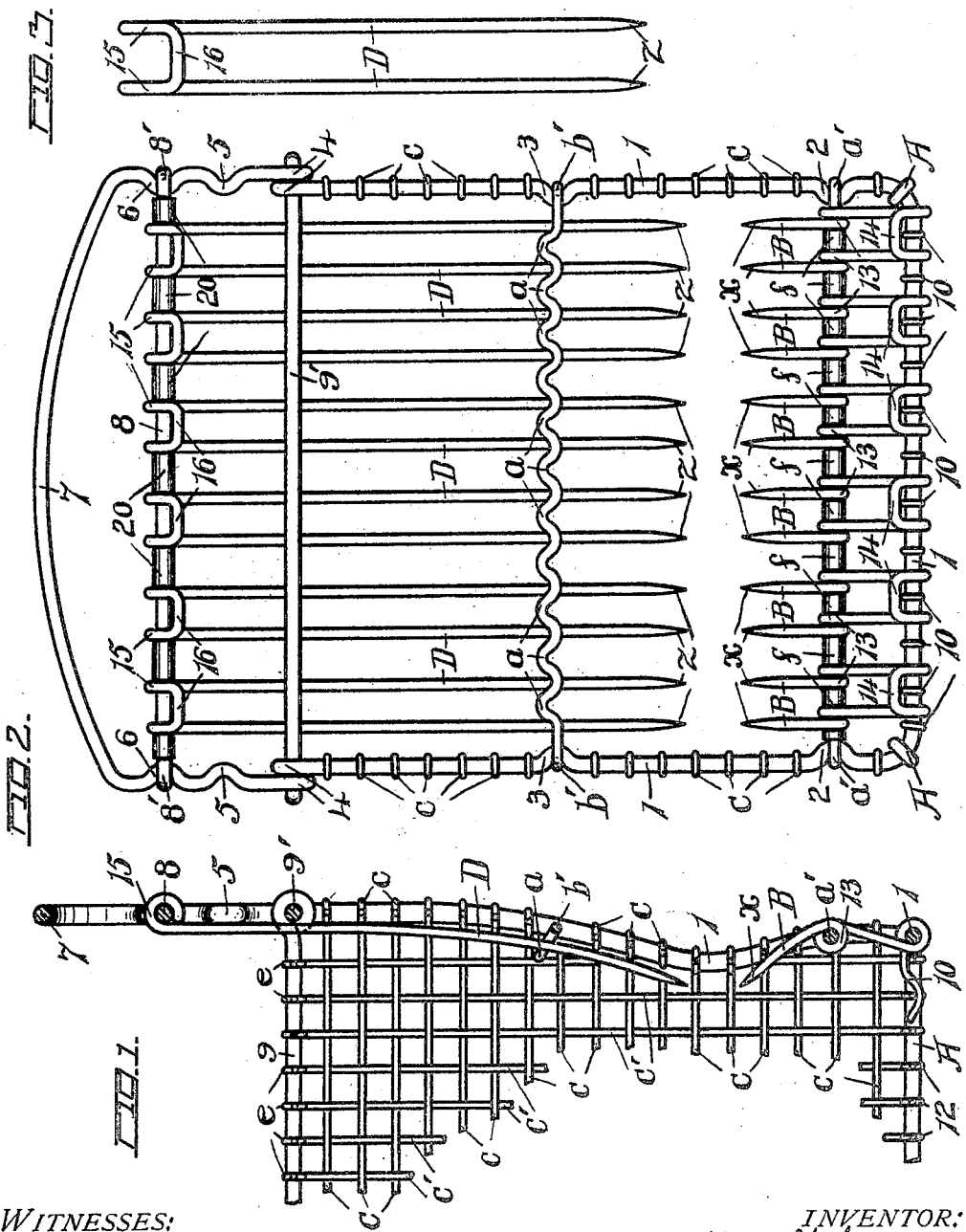

JOHN SHEPHERD, OF CHICAGO, ILLINOIS, ASSIGNOR OF ONE-HALF TO PATRICK E. O'NEIL, OF CHICAGO, ILLINOIS.

TRAP.

No. 801,923.　　　Specification of Letters Patent.　　　Patented Oct. 17, 1905.

Application filed January 23, 1905. Serial No. 242,444.

*To all whom it may concern:*

Be it known that I, JOHN SHEPHERD, a citizen of the United States, and a resident of Chicago, in the county of Cook and State of Illinois, have invented a certain new and useful Improvement in Traps, of which the following is a specification.

The aim of my invention is to provide a trap so arranged that the same may be adjusted to catch various-sized animals, being provided with a plurality of adjustably-held spear-hangers which may be raised and lowered in connection with a plurality of fixed hooks so as to provide a wide or narrow opening through which the animals may enter the trap, so that my trap may be set to catch mice, in providing a very narrow entry space or opening or be set to provide a wide entry space or opening to permit the entry of rats or larger animals, as will be described more fully hereinafter.

In the accompanying drawings I have shown in Figure 1 a broken side view in section of the end of a trap embodying my invention with portions removed. Fig. 2 shows an end view of my trap, while Fig. 3 shows a detail of one of the spear-hangers as used in my invention.

In carrying out the aim of my invention I construct a rectangular housing of any suitable width, length, and depth, made of wire, sheet metal, or any suitable material, which I provide at one or more ends with a series of inwardly-extending fixed hooks, above which are adjustably held a set of spear-hangers.

In the accompanying drawings I have shown portions of a trap embodying my invention made of wire. In constructing these traps of wire I use two similar end members, comprising a straight bottom portion 1, which is then bent upward, as is shown in Fig. 2, and at a suitable point is provided with the bend 2 at opposite points, and from this bend 2 extend straight sections inward to a suitable point, when they are each provided with the bends 3 3. It will be noticed that these bends 2 and 3 are curved inward, and from the bends 3 the end frame members continue upward until I provide the loops 4 4 at opposite points, and extending from these loops are straight portions provided with the upwardly-extending bends 5, above which are positioned the bends 6 6, the end frame member terminating in the upwardly-curved loops 7, as is clearly shown in Fig. 2. Two such end frame members are used, as has been described, and below these end frame members are connected by the side, base, or bottom bars A, the ends of which are looped about the end frame members, while the top of the trap is formed by means of a rectangular wire frame comprising two similar side members 9 and two similar end members 9', these members 9' extending between the loops 4, the end frame members being suitably secured by solder or any other means to the upper rectangular frame comprising the sections 9 and 9'.

Extending lengthwise from the bottom portions 1 of the end members are a plurality of wire sections 10, while interwoven with these sections 10 are suitable transverse sections 12, extending from the lower side bottom bars or wires A to form the bottom of the trap.

The sides of the traps are formed by means of the horizontally-disposed wires $c$, extending from the vertical portions of the end frame members, and the wires $c'$, extending from the upper frame members 9, which are wound about the lower bottom bars A.

The two ends of the trap are formed by means of the lower fixed hooks B, which are in the form of tines provided with the intermediate loops 13, as shown in Figs. 1 and 2, which loop about a transverse wire $a'$ and below are curved about the bottom portion of the end frame member 1, as clearly shown in Fig. 2. These fixed hooks B are somewhat in the form of a hair-pin, with the exception that the stems or tines are provided with the intermediate loops 13 and that the curved end is bent upon the base end frame members. In order to prevent these fixed hooks, which are pointed, as shown at $x$, from becoming laterally displaced, I provide the preferably wooden spools $f$, positioned upon the wire member $a'$, so that these fixed hooks cannot be laterally displaced. In referring to Fig. 1 it will be noticed that the end frame members 1 are curved in slightly and that these fixed hooks also curve inward, so that the animal in entering the trap may readily pass over these fixed inwardly-curved hooks, which are provided with a point, as is shown at $x$. These hooks, it will be noticed, all end in a straight line, and adjustably held above the same are the pendent spear-hangers D, provided with the loops 15 and an intermediate section 16, as is shown in Fig. 3, these spear-hangers more nearly representing a hair-pin than the fixed hooks B, with the exception that the hangers D are provided with sharp points $z$. These pendent spear-hangers move freely upon an adjusting-bar 8, also made of wire and provided with the terminal loops or eyelets 8', as shown in Fig. 2, these eyelets being adapted to work into the bends 5 and 6, which form seatings within which the adjusting-bar 8 is held, as shown in Fig. 2.

In order to prevent the spear-hangers from becoming laterally displaced, I interpose between them the spools 20, as shown in Fig. 2. Near the lower end the spear-hangers rest against the transverse corrugated bar $b'$, fixed within the bends 3, the corrugation being so placed that the lower ends of the hangers are held within the corrugation to prevent them from being laterally displaced in the animal trying to worry itself out of the trap and also insuring these hangers being held in proper alinement.

Now we will assume that when the adjusting-bar 8 is carried upward the open space between the hook ends and hanger ends is of a width to permit the ready entry of an ordinary-sized rat. A suitable bait would be suspended from the hook 17, and the animal in entering the trap would walk over the hooks B and readily push upward the swinging and pivotally-held hangers B to enter the trap. In getting out of the same slot, however, the animal would encounter the sharply-pointed inwardly-curved hooks and hangers, which would deter the animal ordinarily from attempting to make an escape. If, however, the animal should attempt to worry itself and force itself against the hook and hanger points, it would simply result in impaling itself upon the hooks and hangers. If this same trap should be used for the purposes of catching mice, the upper end frame portions would be contracted, the loop portion 7 permitting this, so that the adjusting-bar 8 could be slid downward, so that the eyelets 8' would find a seating within the bends 5, so that the trap would be adjusted to be used as a mouse-trap, the opening then being narrow, so as to prevent the escape of an ordinary-sized mouse through the entry-slot, though, of course, a rat could also enter the trap when thus adjusted, for the reason that the spear-hangers could be swung inward far enough to permit the entry of a rat.

The upper end frame portions 7 at each end are nicely adapted to be used as handles in carrying the trap, which may be made of suitable sizes.

Having thus described my said invention, what I claim as new, and desire to secure by United States Letters Patent, is—

1. A trap comprising a suitable housing, in combination with a plurality of fixed inwardly-curved hooks, a plurality of pendent adjustably-held pointed hangers terminating adjacent said hooks, said hangers as a body being adjustable, substantially as set forth.

2. A trap comprising a suitable housing in combination with a plurality of fixed inwardly-curved hooks, an adjustably-held bar, and a plurality of pivotally-held spear-hangers secured to said bar and terminating adjacent said fixed hooks.

3. In a trap, a combination with a suitable housing of an end frame member provided with a plurality of seatings, a transverse bar adjustably held within said seatings, a plurality of spear-hangers movably secured to said bar, a transverse frame member near the lower end of said end frame member, a plurality of fixed hooks bent about said transverse frame member, and the lower ends of said hooks bent about the lower end of said frame member all arranged as set forth.

In testimony whereof I affix my signature in presence of two witnesses.

JOHN SHEPHERD.

Witnesses:
 GEORGE W. SUES,
 MAMIE S. POEHLS.